United States Patent [19]

Inaba et al.

[11] Patent Number: 4,833,586

[45] Date of Patent: May 23, 1989

[54] PWM CONTROL FOR POWER CONVERTER SYSTEM UTILIZING PULSE DROPPING AT MINIMUM PULSE WIDTHS

[75] Inventors: Hiromi Inaba; Seiya Shima, both of Katsuta; Takeki Ando, Ibaraki; Toshiaki Kurosawa; Nobuo Mitsui, both of Katsuta, all of Japan

[73] Assignee: Hitachi, Ltd., Tokyo, Japan

[21] Appl. No.: 111,675

[22] Filed: Oct. 23, 1987

[30] Foreign Application Priority Data

Oct. 25, 1986 [JP] Japan ................. 61-254335

[51] Int. Cl.$^4$ ............................................. H02M 7/48
[52] U.S. Cl. ...................................... 363/41; 318/811; 363/37
[58] Field of Search .......................... 363/37, 41, 42; 318/811

[56] References Cited

U.S. PATENT DOCUMENTS 4,377,779 3/1983 Plunkett .............................. 363/41
4,672,520 6/1987 Ueda et al. .......................... 363/37

FOREIGN PATENT DOCUMENTS 9783 4/1980 European Pat. Off. ............ 318/811
148182 11/1981 Japan .................................. 363/41

OTHER PUBLICATIONS

Grant et al., "Technique for Pulse Dropping in Pulse-Width Modulated Inverters", IEE Proc., vol. 128, Pt. B, No. 1, pp. 67-72 (Jan. 1981).

*Primary Examiner*—William H. Beha, Jr.
*Attorney, Agent, or Firm*—Antonelli, Terry & Wands

[57] ABSTRACT

A pulse generator (including a microcomputer) for supplying a pulse pattern to semiconductor devices of a power converter (such as an inverter or a converter) using the pulse width control scheme is provided with function of dropping pulses so that the pulse pattern may form a predetermined function provided that the pulse width is shorter than a limit value (Limit). As a result, the input and output waveforms of the power converter can be made sinusoidal and can be released from the constraint of the minimum pulse width of power conversion semiconductor devices.

10 Claims, 17 Drawing Sheets

FIG. 8

| SEQUENCE OF FIRING / REGION OF $\theta_T$ | TRANSISTOR WHICH SHOULD BE ALWAYS IN ON STATE DURING $\Delta t_1$ | TRANSISTOR WHICH SHOULD BE IN ON STATE UNTIL OCCURRENCE OF THE FIRST EVENT | TRANSISTOR WHICH SHOULD BE IN ON STATE UNTIL OCCURRENCE OF THE SECOND EVENT | TRANSISTOR WHICH SHOULD BE FIRED AFTER OCCURRENCE OF THE SECOND EVENT |
|---|---|---|---|---|
| 0° ~ 60° | 55 | 53 | 51 | 52 |
| 60° ~ 120° | 51 | 55 | 56 | 54 |
| 120° ~ 180° | 56 | 51 | 52 | 53 |
| 180° ~ 240° | 52 | 56 | 54 | 55 |
| 240° ~ 300° | 54 | 52 | 53 | 51 |
| 300° ~ 360° | 53 | 54 | 55 | 56 |

| $\theta_T$ | TIME LENGTH $t_{E1}$ UNTIL OCCURRENCE OF THE FIRST EVENT $t_{E1} = \Delta t_1 \cdot \sin(\theta_T - 240°)$ | TIME LENGTH $t_{E2}$ UNTIL OCCURRENCE OF THE SECOND EVENT $t_{E2} = t_{E1} + \Delta t_1 \cdot \sin\theta_T$ |
|---|---|---|
| 1 | $t_{E11}$ | $t_{E21}$ |
| 2 | $t_{E12}$ | $t_{E22}$ |
| ⋮ | ⋮ | ⋮ |
| n | $t_{E1n}$ | $t_{E2n}$ |
| ⋮ | ⋮ | ⋮ |
| 60 | $t_{E160}$ | $t_{E260}$ |

FIG. 14
(a)
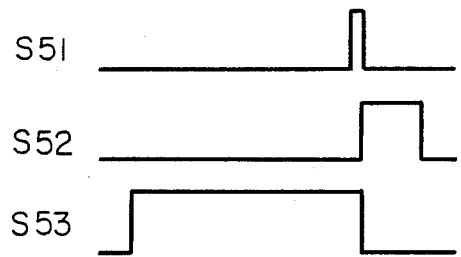
(b)
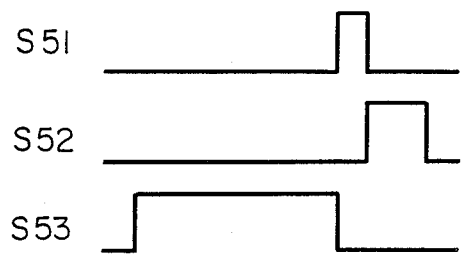
(c)
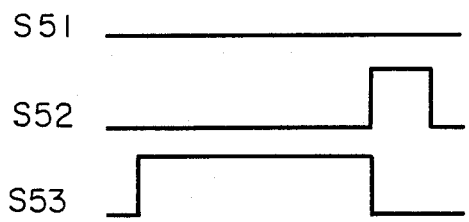

FIG. 15
(a)
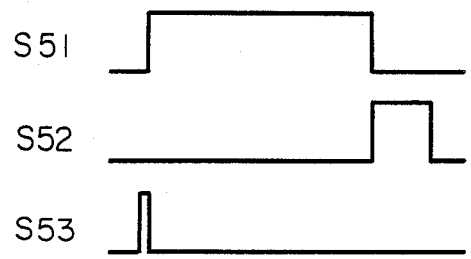
(b)
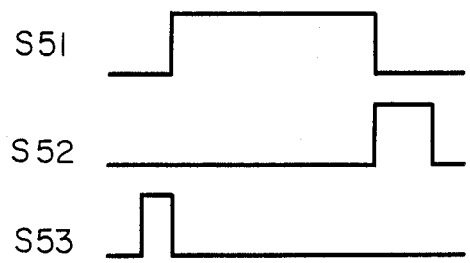
(c)
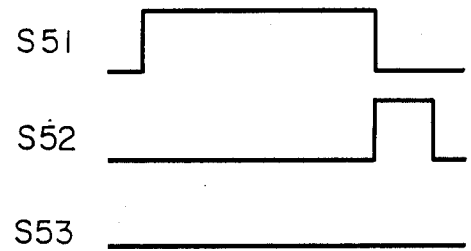

FIG. 18

— MODE M6 —|— MODE M61 HAVING MIXTURE OF MODE M6 AND MODE M1 —|— MODE M1 —

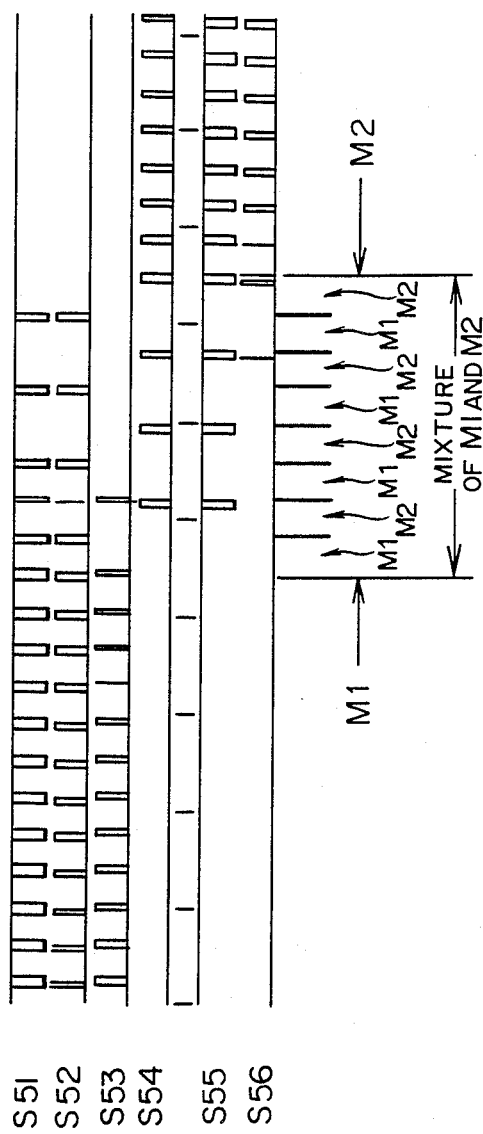

PWM CONTROL FOR POWER CONVERTER SYSTEM UTILIZING PULSE DROPPING AT MINIMUM PULSE WIDTHS

BACKGROUND OF THE INVENTION

The present invention relates to an apparatus for controlling a power converter, and in particular to an apparatus for controlling a power converter suitable for improving the output wave-form while satisfying the control requirement for the minimum pulse width of the semiconductor device of the main circuit.

As conventional apparatuses for controlling a power converter such as inverter or converter, apparatuses using the PWM (Pulse Width Modulation) control scheme are widely known. In the pulse width modulation scheme, semiconductor devices of the main circuit are turned on and off to cause commutation a number of times, and the pulse widths of a plurality of square-wave pulses are modulated and controlled.

As an example, a current type inverter system including a combination of six semiconductor devices such as GTOs having the reverse-blocking function or series circuits of diodes, GTOs and transistors, DC reactors and capacitors for each of the three-phase circuit has been proposed as described in proceedings of National Conference of the Institute of Electrical Engineers of Japan, 1985, No. 502, page 587. This circuit has configuration as shown in FIG. 1. A quiet system has thus been realized by using the simple configuration. Numeral 1 denotes three-phase AC power supply, numerals 2 and 6 overvoltage suppressing capacitors, numeral 3 a current type converter having 6 GTOs, numeral 4 a DC reactor, numeral 5 a current type inverter having 6 GTOs, and numeral 7 denotes a load.

This system is originally configured to produce sinusoidal output voltage. Even when a general-purpose motor is connected as the load 7, therefore, only extremely small noises are generated. So long as a special contrivance is not devised, a square-wave current is originally outputted, resulting in a problem of torque ripple.

As for this problem of output current, a scheme in which a pulse pattern is so generated as to produce a sinusoidal output has been proposed in JP-A-60-98876. This results in a significant effect.

Even in this known example, however, there is a fact which is considered to pose a problem. In case a very low frequency current output is needed, the problem is caused. In order to realize an equivalent output current I of the inverter, as shown in FIG. 2A current commands $i_0$ having width controlled in accordance with PWM (pulse width modulation), as shown in FIG. 2B which shows the area in vicinity of 0-cross point of FIG. 2A in an enlarged scale, are outputted to a phase. When a current I has a value near zero, the pulse current command $i_0$ must be very narrow in pulse width. Especially when the output frequency of the inverter is very low, narrow width pulses must be outputted in succession in order to obtain a sinusoidal output.

However, GTOs and transistors used in the power converters 3 and 5 are usually subject to limitation of minimum pulse width beyond which the pulse width should not be narrowed because of the device rating as described in "New Drive Electronics", pages 278–279, published by Denki Shoin in Japan, for example. From the viewpoint of preventing the device breakdown, the limit value in pulse width is approximately 30 to 100 $\mu$sec.

When a low frequency is outputted, therefore, the width of the pulse current i is limited to the above described limit value and remain constant as represented by $i_1$ although the current I should vary. This results in a problem that the sinusoidal wave of the output current is not attained in a part thereof. This phenomenon occurs in the vicinity of zero crosspoints for each of three-phase outputs and affects outputs of other phases. At intervals of 60° in electrical angle, therefore, torque shocks are generated in the vicinity thereof.

The problem has heretofore been described by taking the output of the inverter as an example. A similar phenomenon is true of the converter. In this case, the input current waveform of the converter falls off the sine wave at intervals of 60° in electrical angle. Higher harmonic currents are thus generated for the power supply.

In the above described prior art, the effect of components of the power converter on the output having the minimum pulse width was not considered. And there were problems in the input and output waveforms.

The present inventors proposed novel apparatuses for controlling power converters in U.S. application Ser. No. 2283, "METHOD AND APPARATUS FOR CONTROLLING POWER CONVERTER", H. Inaba et al., filed on Jan. 1, 1987 (Priority claimed application: Japanese Patent Application No. 2875/86) and U.S. application Ser. No. 2199, "AN APPARATUS FOR CONTROLLING POWER TRANSDUCERS OF THE PULSE WIDTH MODULATION (PWM) CONTROL TYPE", H. Inaba et al., filed on Jan. 1, 1987 (Priority claimed application: Japanese Patent Application Nos. 2876/86 and 2877/86). However, the effect of components of the power converter on the output of the minimum pulse width has not been mentioned in the above described U.S. Applications.

An object of the present invention is to provide an apparatus for controlling power converter capable of making the input and output waveforms sinusoidal up to the ultra low frequency region.

SUMMARY OF THE INVENTION

A feature of the present invention is that a pulse generation unit for supplying a pulse pattern, which determines the ON-OFF timings of the semiconductor devices of a power converter such as an inverter or a converter using the pulse width control scheme is provided with function of dropping pulses so that the above described pulse pattern forms a predetermined function provided that the pulse width is smaller than a limit value.

Since pulses of the pulse pattern supplied to the semiconductor devices of the power converter are dropped on the basis of a predetermined condition, the input and output waveforms of the power converter become sinusoidal. The input and output of the power converter are not affected by the above described restriction of the minimum pulse width of semiconductor devices.

BRIEF DESCRIPTION OF THE DRAWINGS

FIG. 8 is a diagram used for explaining the mode.

FIGS. 14(a) to 14(c) and 15(a) to 15(c) are waveform diagrams showing examples in the overall phases represented as $\theta_T < 30°$ and $\theta_t \geq 30°$, respectively.

FIG. 18 shows the firing sequence of power conversion devices of a system having overlapped modes according to another embodiment of the present invention.

FIG. 20 shows a pulse pattern appearing during the mode transition according to another embodiment of the present invention.

DESCRIPTION OF THE PREFERRED EMBODIMENTS

Embodiments of the present invention will now be described by referring to drawings.

Figure 3:
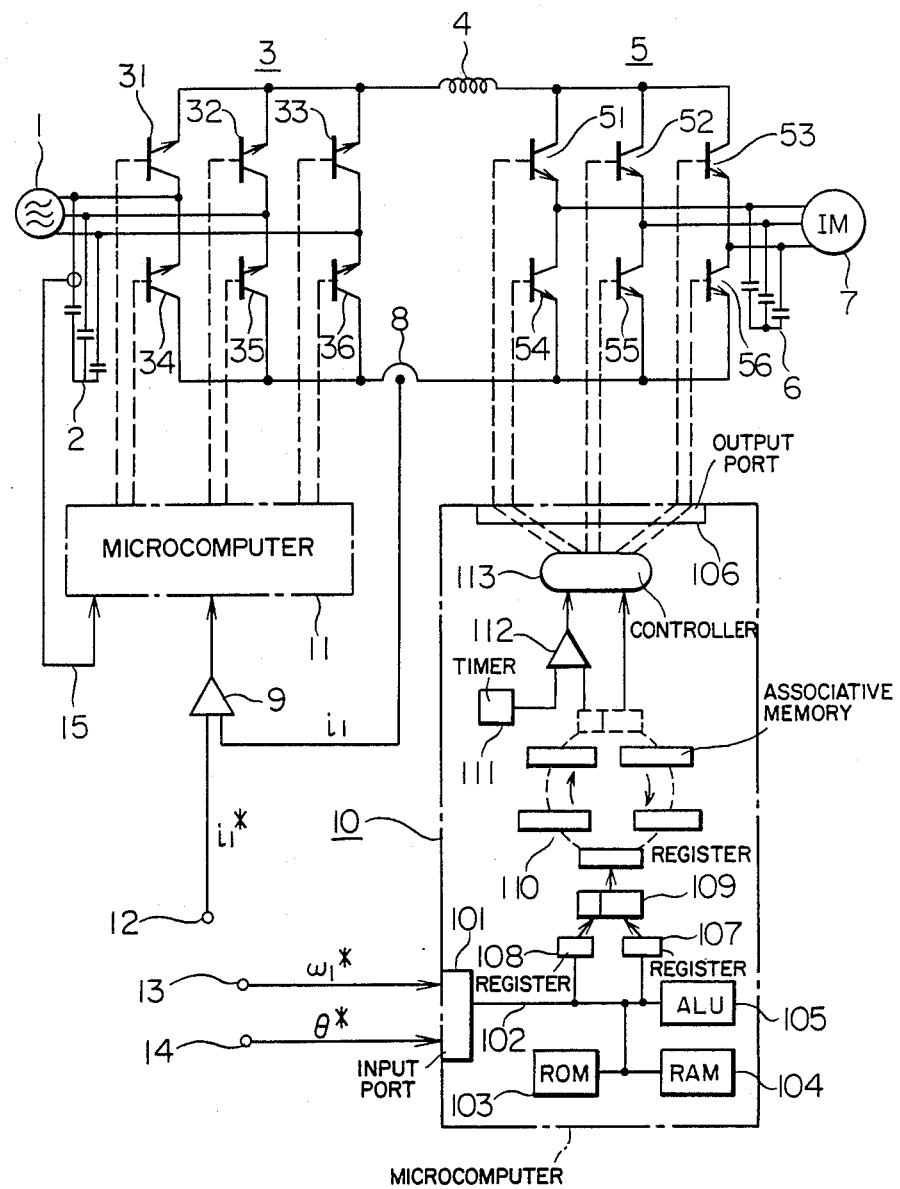
FIG. 3 is an overall configuration diagram showing an embodiment of an apparatus for controlling power converter according to the present invention.

FIG. 3 is an overall configuration diagram showing an embodiment of an apparatus for controlling a power converter according to the present invention. In FIG. 3, numeral 1 denotes three-phase AC power supply, numeral 2 a capacitor for suppressing overvoltage, numeral 3 a current type converter section, numerals 31 to 36 transistors constituting main switching devices of the converter section 3, numeral 4 a DC reactor, numeral 5 a current type inverter section, numerals 51 to 56 transistors constituting main switching devices of the inverter section 5, numeral 6 a capacitor for suppressing overvoltage, numeral 7 an induction motor shown as an example of a load, numeral 8 a DC current detector, numeral 9 a comparator for comparing a primary current command $i_1^*$ with a feedback value $i_1$, and numerals 10 and 11 denote single chip microcomputers of supplying a pulse pattern (control signals) to the transistors 31 to 36 and 51 to 56. (These single chip microcomputers 10 and 11 have substantially the same hardware structures. Accordingly, those microcomputers are described later in detail mainly by taking the microcomputer 10 as an example.)

Numeral 12 denotes a terminal supplied with the primary current command $i_1^*$ to be supplied to the converter control system. Numerals 13 and 14 denote terminals supplied with a frequency command $\omega_1^*$ and a phase command $\theta^*$ to be supplied to the inverter control system. The commands $\omega_1^*$ and $\theta^*$ are given in the form of digital signals. And numeral 15 denotes a signal line for inputting a signal for power supply synchronization.

The single chip microcomputer 10 includes an input port 101 of internal commands, an internal bus 102, a ROM 103 for storing therein program, a pulse width data table and so on, a RAM 104 used as a temporary memory or a register, an ALU 105 for executing operation and so on, an event setting register 107 for setting an event, on the basis of which a control signal comprising a predetermined pulse pattern, which determines the ON-OFF timings of the semiconductor elements, is applied to an output 106, a time setting register 108 for setting the time when the above described event is enabled, a holding register 109 for coupling the contents of both setting registers 107 and 108 and holding the coupled contents, an associative memory 110 for successively and cyclically storing several sets of set point data set in the holding register 109, a timer 111 for outputting the actual time, a comparator 112 for comparing the time outputted from the timer 111 with the time set in the associative memory 110 and for producing an output upon coincidence, and an execution controller 113 for controlling the output so as to output the set event to the output port 106 in response to a trigger supplied from the comparator 112. The term "event" is used to indicate any variation in conductivity of any of the semiconductor elements constituting the converter or inverter.

The operation of this embodiment will now be described. First of all, however, it will now be described by taking a case of inverter control as an example.

Figure 4:
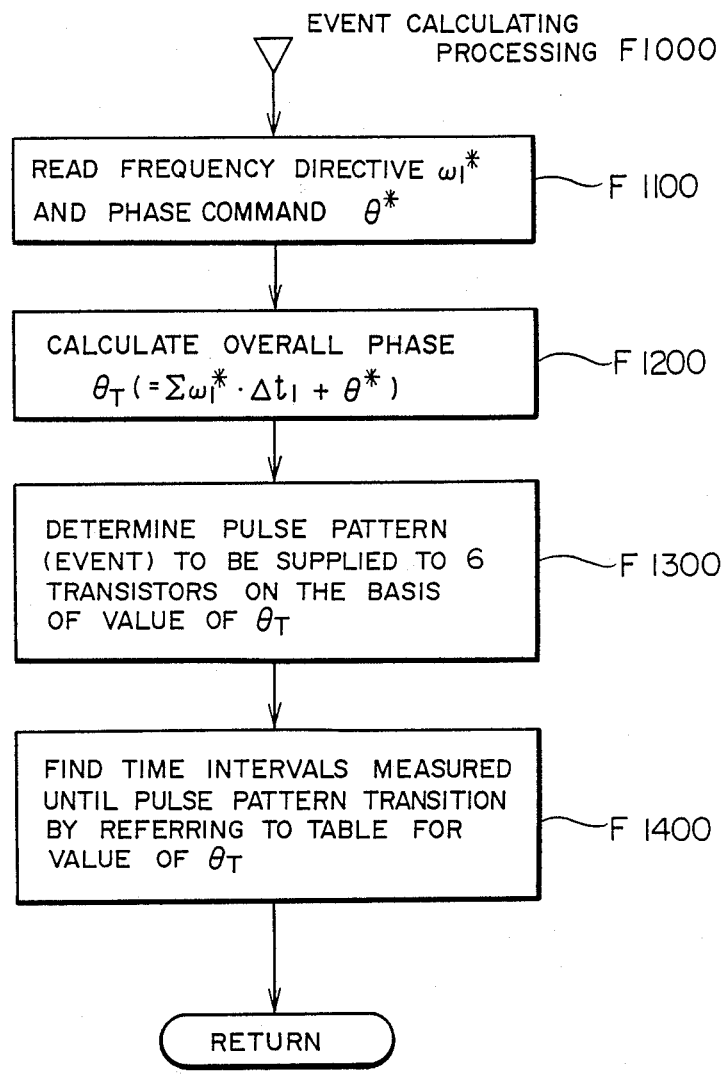
FIG. 4 is a flowchart for illustrating an embodiment of event calculating processing.

FIG. 4 is a schematic flowchart of event calculation processing program F1000 for deriving data determining the event to be generated at the output 106, i.e., the pulse pattern. First of all, the frequency command $\omega_1^*$ and the phase command $\theta^*$ are read from the input 101 at a step F1100. If $\omega_1^*$ and $\theta^*$ are also calculated in the single chip microcomputer 10, it is a matter of course that the port reading at the step F1100 becomes unnecessary. At a step F1200, an overall phase $\theta_T$ is then derived by integrating the frequency command $\omega_1^*$ at constant time intervals $\Delta t_1$ and by adding the result of integration to the phase command $\theta^*$. The range of electrical angle 360° is divided by 60° to produce six modes. It is determined at a step F1300 which mode should output its pulse pattern under the overall phase $\theta_T$ thus derived. That is to say, the output event depending upon the overall phase $\theta_T$ is derived. The relation between the overall phase $\theta_T$ and 6 modes will be described later in detail. Finally at a step F1400, time intervals $t_{E1n}$ and $t_{E2n}$, which determine timings of variation of the pulse pattern, i.e. timings of variation in conductivity of any semiconductor elements, in an interrupt interval $\Delta t_1$ are derived by referring to a data table for the overall phase $\theta_T$. Two items, i.e., the contents of the event, such as which semiconductor elements are to be turned ON or OFF, and the event transition time, such as the timing when the specified semiconductor element is to be turned ON or OFF, to be set in two registers 107 and 108 have thus been found by these steps.

Figure 5:
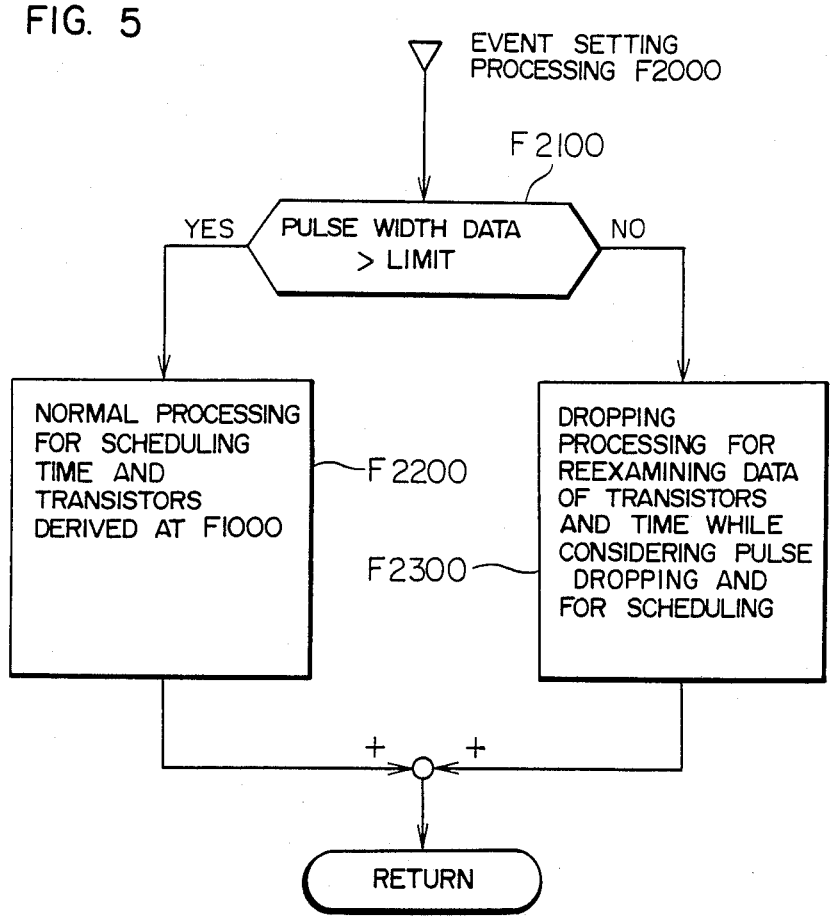
FIG. 5 is a flowchart for illustrating an embodiment of setting processing.

FIG. 5 shows a schematic flow chart of event setting processing program F2000 for setting the two items derived as described above into the associative memory 110 for controlling the output port. By the event calculation processing, the transistors to be fired and extinguished during the present predetermined section $\Delta t_1$ and those time instants have been determined. If these data are scheduled into the associative memory as they are, however, the ON pulse width or the OFF pulse width of the main transistor does not satisfy the rated value of the device in some cases. In this event setting processing F2000, therefore, pulse width data are examined first of all at a step F2100. If it is not necessary to perform pulse dropping control, a normal schedule processing step F2200 is executed. As a result, the information concerning the transistors to be fired and extinguished and the time derived by the event calculation processing program F1000 is set into the associative memory 110.

If, on the contrary, the pulse width is smaller than the limit value, the pulse width data is calculated again at a step F2300. In addition, the transistors to be fired and extinguished are reexamined, and scheduling for the associative memory 110 is performed on the basis of data after reexamination. The processing for the present $\Delta t_1$ section has thus been finished. The detailed flowchart of the event setting processing F2000 will be described later with emphasis laid on the pulse dropping algorithm. The normal schedule processing step F2200 will now be described first of all.

Figure 6:
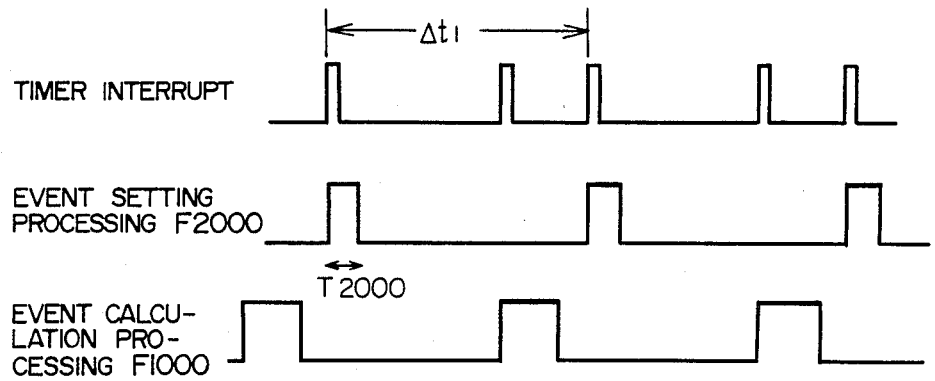
FIG. 6 is a diagram used for explaining the start timing.

FIG. 6 is a time chart showing when the processing F1000 and F2000 are started.

The event setting processing F2000 is started in synchronism with the timer interrupt caused at intervals of $\Delta t_1$. On the other hand, the event calculation processing F1000 is so started by a second timer interrupt occurring prior to the timer interrupt as to complete the event calculation processing before F2000 is started. The event calculation processing F1000 is finished immediately before the event setting processing F2000 so that the latest data may be used by F2000. If a delay unit corresponding to the timer interrupt interval is allowed, it is a matter of course that F1000 may be started immediately after F2000. Since the time required for interrupt judgment becomes short in that case, the interrupt interval $\Delta t_1$ can be made short, and hence the converter can be used at a higher frequency.

Once the predetermined event and time have been set in this embodiment, the associative memory 110 within the microcomputer 10 takes charge of output port control. Accordingly, the main processor section is released from the output processing.

Both tasks are thus started at predetermined time intervals $\Delta t_1$. Accordingly, the pulse decimation control is also executed at intervals $\Delta t_1$.

Figure 7:
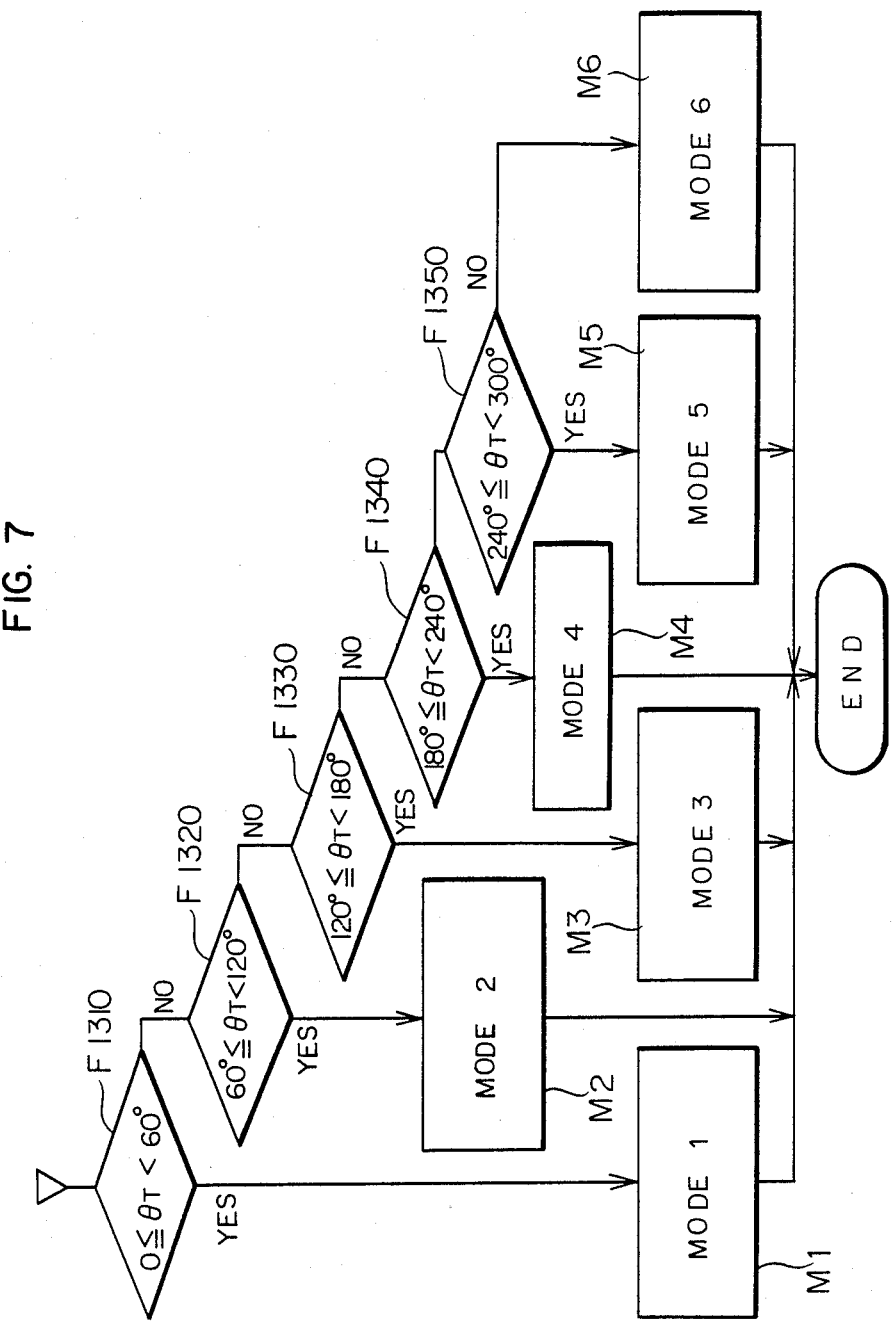
FIG. 7 is a flowchart showing an embodiment of mode selection processing.

Determination of the pulse pattern in the processing F1300 will now be described by referring to FIG. 7.

In the inverter control of this embodiment, the pulse pattern is changed at intervals of electrical angle 60°, and six modes are repeated in a cycle of 360°. One of six modes M1 to M6 respectively having sections of 60° is selected on the basis of the overall phase $\theta_T$. The flowchart of the selection is shown in FIG. 7. At the top of F1300, region check is performed. If the phase $\theta_T$ comes out of the region of 0° to 360°, 360° is added to or subtracted from the phase $\theta_T$ to pull back $\theta_T$ into the region by the region check step.

FIG. 8 shows a combination of transistors to be fired for each of the modes M1 to M6. That is to say, there are shown a transistor which should be always in the ON state during the period $\Delta t_1$, a transistor which should be in the ON state until the occurrence of the first event when it is extinguished, a transistor which should be in the OFF state until the occurrence of the second event and then fired, and a transistor which should be fired at the occurrence of the first event and extinguished at the occurrence of the second event. Once the phase $\theta_T$ is known, therefore, the mode is recognized, and the transistor to be fired and extinguished can be specified. Only the time when the transistor should be fired or extinguished is not yet known at this instant (the instant at which the processing of F1300 is finished).

At the time of event setting, "1" and "0" are respectively set in the register 107 for firing and extinguishment, for example. Each transistor is thus specified to produce a specified output.

Figure 1:
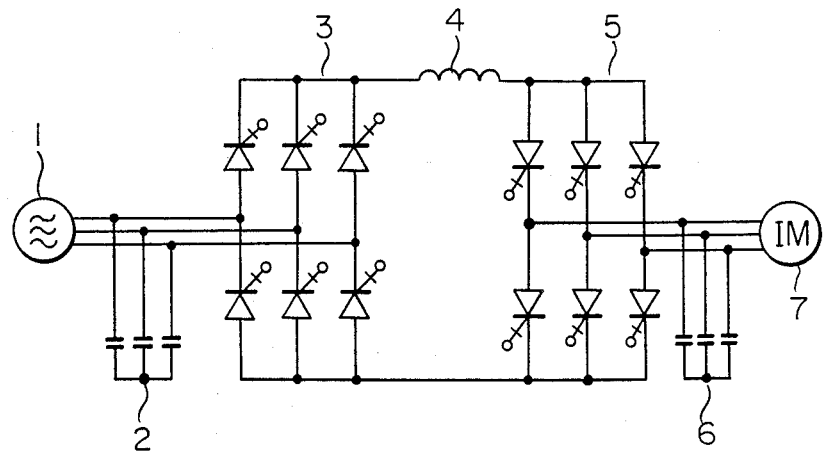
FIG. 1 shows a conventional current type inverter system.
Figure 2A:
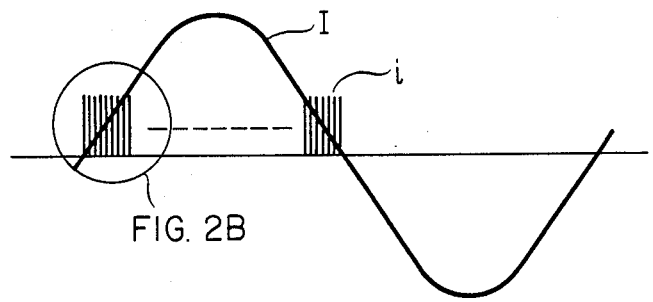
FIGS. 2A and 2B are waveform diagrams used for explaining the problems prior art.
Figure 2B:
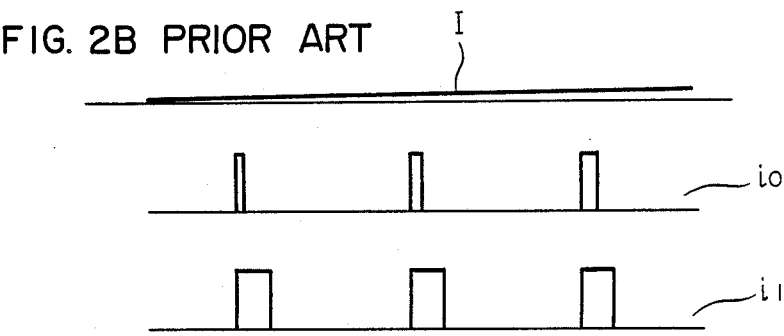

The processing for finding the time instant at which the event is to be changed (i.e., F1400 shown in FIG. 2) will now be described by referring to FIG. 9.

In conclusion, a waveform close to a sinusoidal output is needed. In a scheme used in this embodiment, therefore, the interrupt interval $\Delta t_1$ is distributed over the ratio of peak values with respect to $\sin(\theta_T - 120°)$ and $\sin(\theta_T - 240°)$ which are displaced in phase from $\sin \theta_T$ by 120° and 240°, respectively. That is to say, the time lengths $t_{E1n}$ and $t_{E2n}$ respectively measured until the occurrence of the first and second events, where the first event indicates extinguishing of a first transistor which is first fired during a given time interval $\Delta t$ and firing of a second transistor which is fired simultaneously with extinguishing of the first transistor, and the second event indicates extinguishing of the second transistor and firing of a third transistor at the same time during that time interval $\Delta t$ are calculated as functions of the phase $\theta_T$ in accordance with expressions below and stored as a table beforehand to allow reference for the phase $\theta_T$.

$$t_{E1n} = \Delta t_1 \cdot \sin(\theta_T - 240°), \tag{1}$$

$$t_{E2n} = t_{E1n} + \Delta t_1 \cdot \sin \theta_T$$

In the present embodiment, an example of a current-type inverter is shown. Accordingly, the inverter need only function as switches for transforming the waveform into a sinusoidal wave, resulting in a merit that the data table processing is unnecessary. In the application to a voltage-type inverter, data processing with due regard to the amplitude and so on must be performed after reference to the table.

Figures 9, 10:
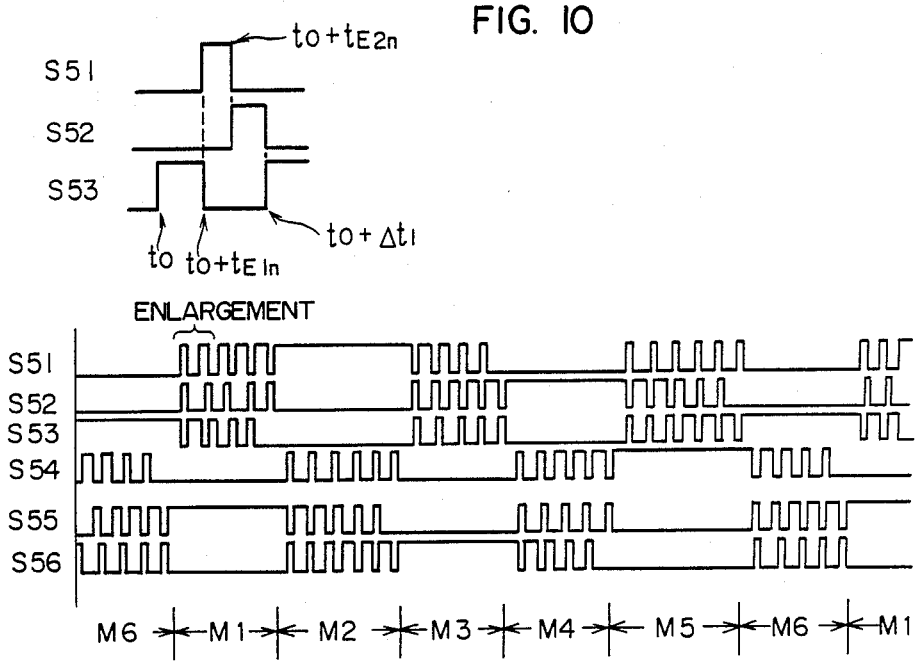
FIG. 9 is a diagram used for explaining the time setting processing.
FIG. 10 is a description diagram showing an example of signal waveforms.

FIG. 10 shows the operation modes and an example of a set of port output signals S51 to S56 supplied to the transistors 51 to 56.

Nonuniformity among electrical angles of modes is caused because the timer interrupt interval $\Delta t_1$ is not in synchronism with the frequency command $\omega_1^*$. The nonuniformity can be eliminated by using such control as to vary $\Delta t_1$ in response to $\omega_1^*$.

Figure 11:
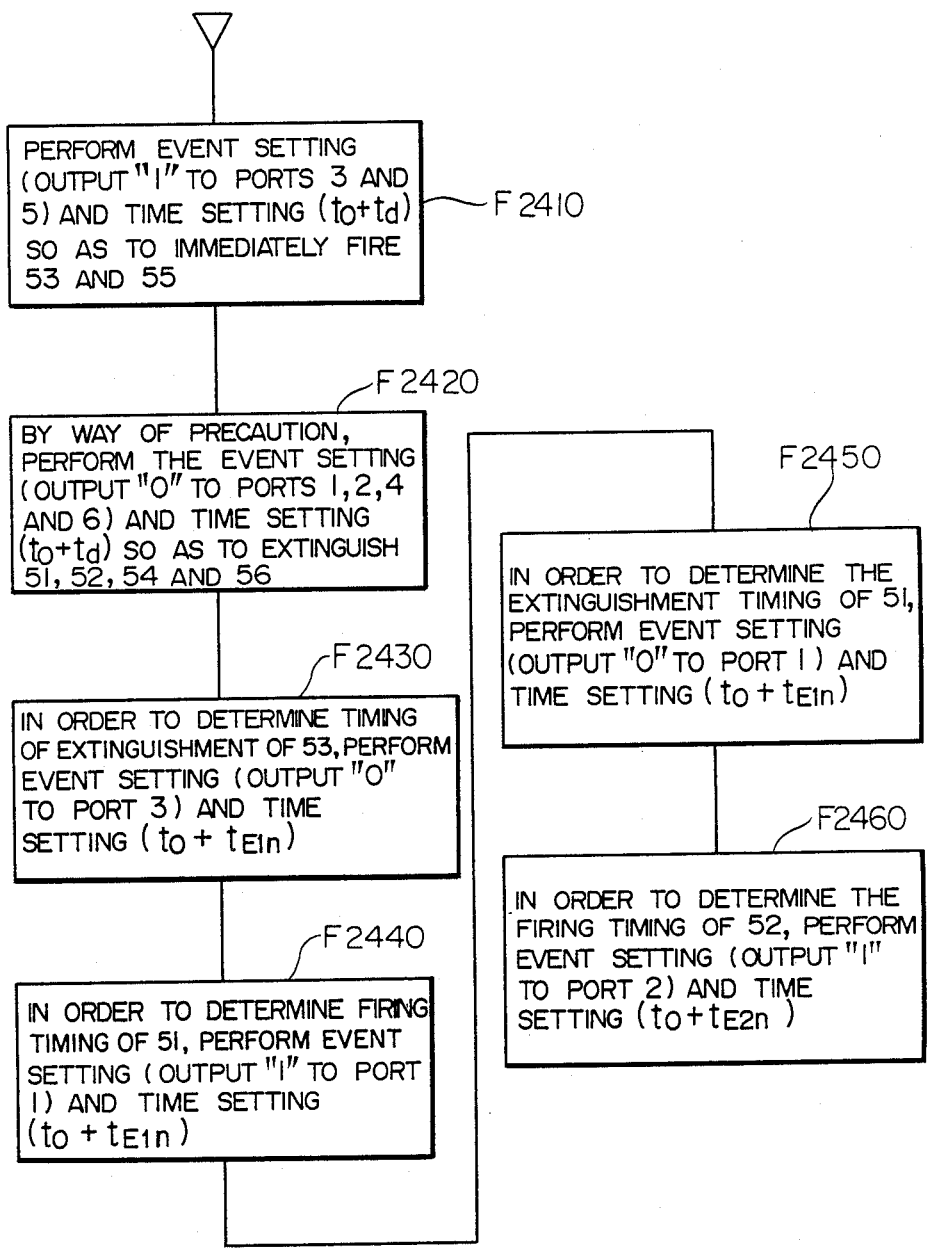
FIG. 11 is a flowchart showing an embodiment of detailed event setting processing.

A flowchart of concrete event setting processing with the beginning part of the mode 1 of FIG. 10 taken as an example is shown in FIG. 11. The processing F2200 of FIG. 5 was described briefly, but in fact several steps are executed in series as shown in FIG. 11.

The flowchart of FIG. 11 shows the event setting processing executed during one timer interrupt interval lasting from the instant $t_0$ to the instant $t_0 + \Delta t_1$ as shown in FIG. 10. Upon occurrence of an interrupt at the instant $t_0$, two sets of setting operation comprising event setting and time setting are executed at a step F2410 so that firing signals may be immediately supplied to the transistor 55 which should be always in the ON state under the mode 1 (see FIG. 8) and the transistor 53 which should be in the ON state only until the occurrence of the first event. That is to say, such event setting as to generate "1" on ports 3 and 5 corresponding to the transistors 55 and 53 is performed. Succeedingly as the time setting, predetermined time $t_d$ is added to the current time $t_0$, and the resultant sum is set in a predetermined register. Since the transistor is to be fired immediately, a small value as far as possible must be chosen as the time $t_d$. As a result, the event and time are set in the associative memory 110. When the time $t_d$ has elapsed, signals "1" are outputted to the transistors 55 and 53 in accordance with the schedule.

The reason why the predetermined time $t_d$ is added will now be described. Some time necessarily elapses from the event setting into the associative memory 110 to the event reading from the memory. If the current time $t_0$ is set without adding the time $t_d$, therefore, the coincidence can no longer be obtained in the comparator 112 which compares the content of the time setting register and the output of the timer. It thus becomes impossible to supply this event to the output 106.

Supposing that there may be a change in operation mode as compared with the last time such as a sudden change in phase command $\theta^*$, the extinguishment of transistors which should be in the OFF state under this mode is confirmed at a step F2420. For this processing, the associative memory 110 is used in the same way as F2410. Since the event is now extinguishment, the event setting is so performed as to generate "0" on ports 1, 2, 4 and 6.

Succeedingly at a step F2430, such schedule processing as to extinguish the transistor 53 at the instant $t_0 + t_{E1n}$ is performed. As the event setting, "0" is outputted to the port 3. As the time setting, $t_0 + t_{E1n}$ is set. Supposing that $t_d$ is a large value to some degree, a plurality of events have been scheduled for one output at an interval in time in the identical timer interrupt.

At a step F2440, the firing schedule of the transistor 51 is set instead of the extinguishment of the transistor 53.

Here, the transistor 53 is extinguished at the same time as the transistor 51 is fired. For the purpose of preventing overvoltage, the time length $t_{E1n}$ of F2430 may be changed from that of F2440 to make the "1" periods overlap each other in a current-type inverter and produce a nonoverlapping period in a voltage-type inverter.

At a second event occurrence point $t_0 + t_{E2n}$, such schedule as to extinguish the transistor 51 (F2450) and such schedule as to fire the transistor 52 (F2460) are successively performed.

In this way, processing including the steps of calculating the phase $\theta_T$, determining the transistor to be extinguished on the basis of $\theta_T$, determining the time when the transistor should be extinguished or fired on the basis of the phase $\theta_T$, and finally making a schedule by pairing the transistor to be extinguished or fired and its time is repeated at intervals of predetermined $\Delta t_1$.

The event setting processing F2000 which is a primary point of the present invention as shown in FIG. 5 will now be described.

Figure 12:
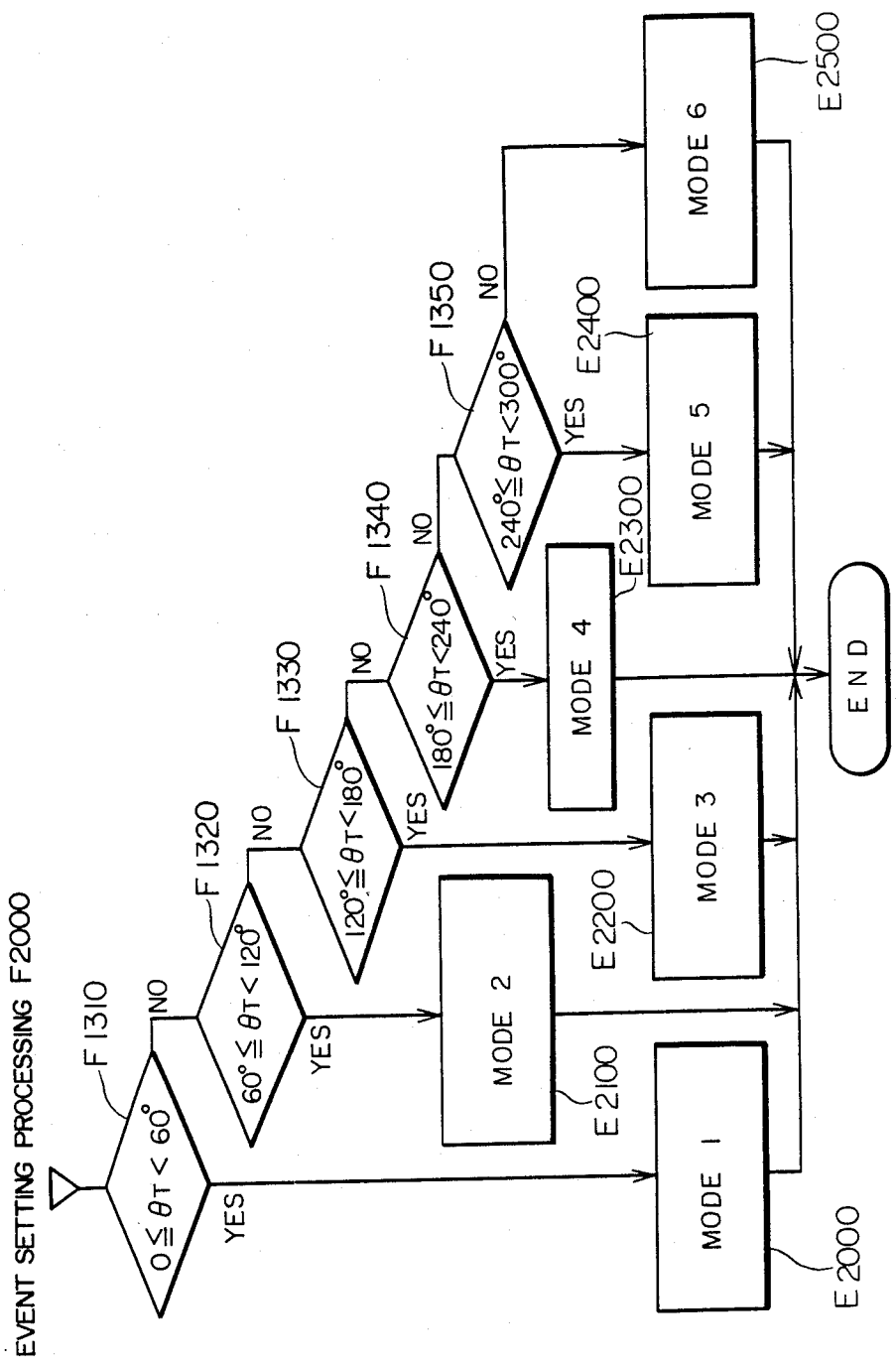
FIG. 12 is a flowchart showing an embodiment of details of the processing shown in FIG. 5.

FIG. 12 shows a detailed flowchart of FIG. 5. The processing will now be described with reference to FIG. 13 by taking a case where the phase $\theta_T$ falls in a range $0 \leq \theta_T < 60°$ in the same way as FIG. 11 as an example. It is judged at a step E2001 shown in FIG. 13 whether the overall phase $\theta_T$ exists in the former half or the latter half of the 60° section. If $0 \leq \theta_T < 30°$, the transistor which might be subject to pulse dropping is not the transistor 53 but the transistor 51. Subsequently at a step E2002, $(t_{E2n} - t_{E1n})$, i.e., the ON period of the transistor 51 is compared with a limit value Limit. If $(t_{E2n} - t_{E1n}) \geq$ Limit, it is not necessary to perform pulse decimation in this $\Delta t_1$ section. Accordingly, normal schedules E2003 to E2005 as described with reference to FIG. 11 are executed.

If it is judged at a step E2002 that $(t_{E2n} - t_{E1n}) <$ Limit, $(t_{E2n} - t_{E1n} +$ residue) is compared with Limit at a step E2006. The "residue" means a value obtained by integrating pulse widths which did not exceed the value of Limit and which occurred until the preceding $\Delta t_1$ section.

If $(t_{E2n} - t_{E1n} +$ residue) > Limit at the step E2006, it is meant that integration value of pulse widths which do not exceed the value of Limit has reached a pulse width which can be supplied to a transistor as a firing pulse. First of all, therefore, the residue is replaced by $(t_{E2n} - t_{E1n} +$ residue $-$ Limit) at a step E2007. At a step E2008, the value of $t_{E1n}$ already derived in FIG. 9 is replaced by $(t_{E2n} -$ Limit) to assure the time corresponding to the value of Limit as $t_{E2n}$. Thereafter, schedules of the steps E2003 to E2005 are executed. If $(t_{E2n} - t_{E1n} +$ residue) < Limit at the step E2006, pulses supplied to the transistor 51 must be dropped. In order to fire the transistor 52 instead of the transistor 51 after the transistor 53 has been fired, therefore, an alternate route is selected instead of a normal schedule route comprising E2003 to E2005. First of all, a new residue is produced at a step E2009. A step E2010 is executed to fire the transistors 53 and 55 immediately and extinguish all of the remaining transistors. Succeedingly, a schedule for preventing the firing of the transistor 51 and delaying the extinguishment of the transistor 53 until the firing of the transistor 52 is performed at a step E2011. The delay of extinguishment is performed by replacing the value of $t_{E1n}$ derived beforehand by $t_{E2n}$.

If $\theta_T > 30°$ at the step E2001, there occurs a possibility that pulses output to the transistor 53 must be dropped. Unless $t_{E1n} <$ Limit at a step E2012, the width of the pulse supplied to the transistor 53 is sufficient. Accordingly, the normal pulse generation schedule comprising the steps E2003 to E2005 is selected.

If $t_{E1n} <$ Limit, $(t_{E1n} +$ residue) is compared with Limit at a next step E2013. If $(t_{E1n} +$ residue) $\geq$ Limit, the integrated pulses become equal to or larger than the Limit value. Accordingly, it becomes possible to output a pulse having the Limit width. Therefore, the residue is updated at a step E2014, and the value of $t_{E1n}$ calculated beforehand is replaced by the Limit value at a step E2015. Thereafter, a schedule comprising the steps of E2003 to E2005 is executed.

If $(t_{E1n} +$ residue) < Limit at the step E2013, pulses outputted to the transistor 53 must be dropped. The residue is updated at a step E2016. Succeedingly at a step E2017, a schedule for immediately firing the transistors 55 and 51 is made, and the remaining transistors are extinguished. Pulses supplied to the transistor 53 have thus been dropped. Finally at a step E2018, the extinguishment timing of the transistor 51 and the firing timing of the transistor 52 are scheduled. The processing is thus finished.

Among 4 routes passing through the steps E2003 to E2005, the route 1 represented as E2001→E2002→E2003→E2004→E2005 and the route 2 represented as E2001→E2012→E2003→E2004→E2005 are normal schedules which have no connection with pulse dropping. The route 3 represented as E2001→E2002→E2006→E2007→E2008→E2003→E2004→E2005 and the route 4 represented as E2001→E2012→E2013→E2014→E2015→E2003→E2004→E2005 pass through normal schedules although the time data E1n is rewritten.

The route 6 represented as E2001→E2002→E2006→E2009→E2010→E2011 and the route represented as E2001→E2012→E2013×E2016→E2017→E2018 are routes involving pulse dropping.

FIG. 14 shows examples of the region having overall phase $\theta_T < 30°$. FIG. 15 shows examples of the region having overall phase $\theta_T \geq 30°$. In each of FIGS. 14 and 15, (a) shows an ideal case where pulses are generated without considering the minimum pulse width of the transistor, and (b) shows a case where the integration value of pulses until the last time exceeds the limit value Limit and the overall pulse is generated. In FIGS. 14(c) and 15(c), the integration value of pulses until the last time does not reach the limit value yet, and hence the overall pulse cannot be produced and pulse dropping is performed.

FIGS. 14(a), (b) and (c) correspond to the routes 1, 3 and 5, respectively. And FIGS. 15(a), (b) and (c) correspond to the routes 2, 4 and 6.

Figure 16:
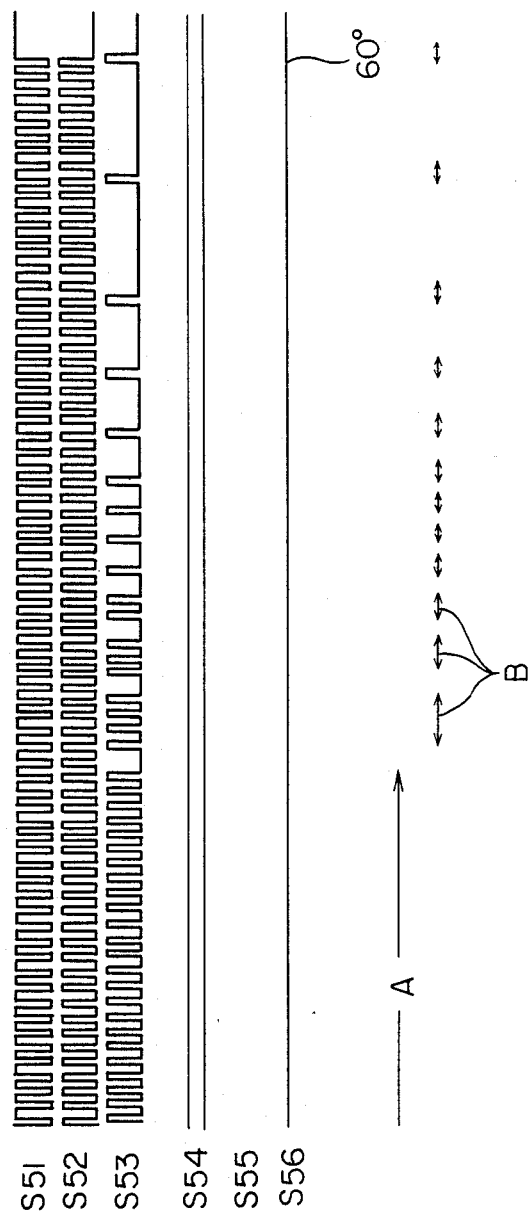
FIG. 16 shows an example of a pulse pattern obtained when the phase angle is approaching an electrical angle 60°.

FIG. 16 shows an example of pulse pattern obtained when the phase $\theta_T$ is short of the electrical angle 60°. As the phase $\theta_T$ approaches 60°, pulses supplied to the transistor 53 are further dropped. It is thus understood that the sinusoidal output is obtained while obeying the restriction of the minimum pulse width. In FIG. 16, a region A corresponds to the execution of the route 2 and a region B corresponds to the execution of the route 4. Other regions correspond to the execution of the route 6.

Figure 13:
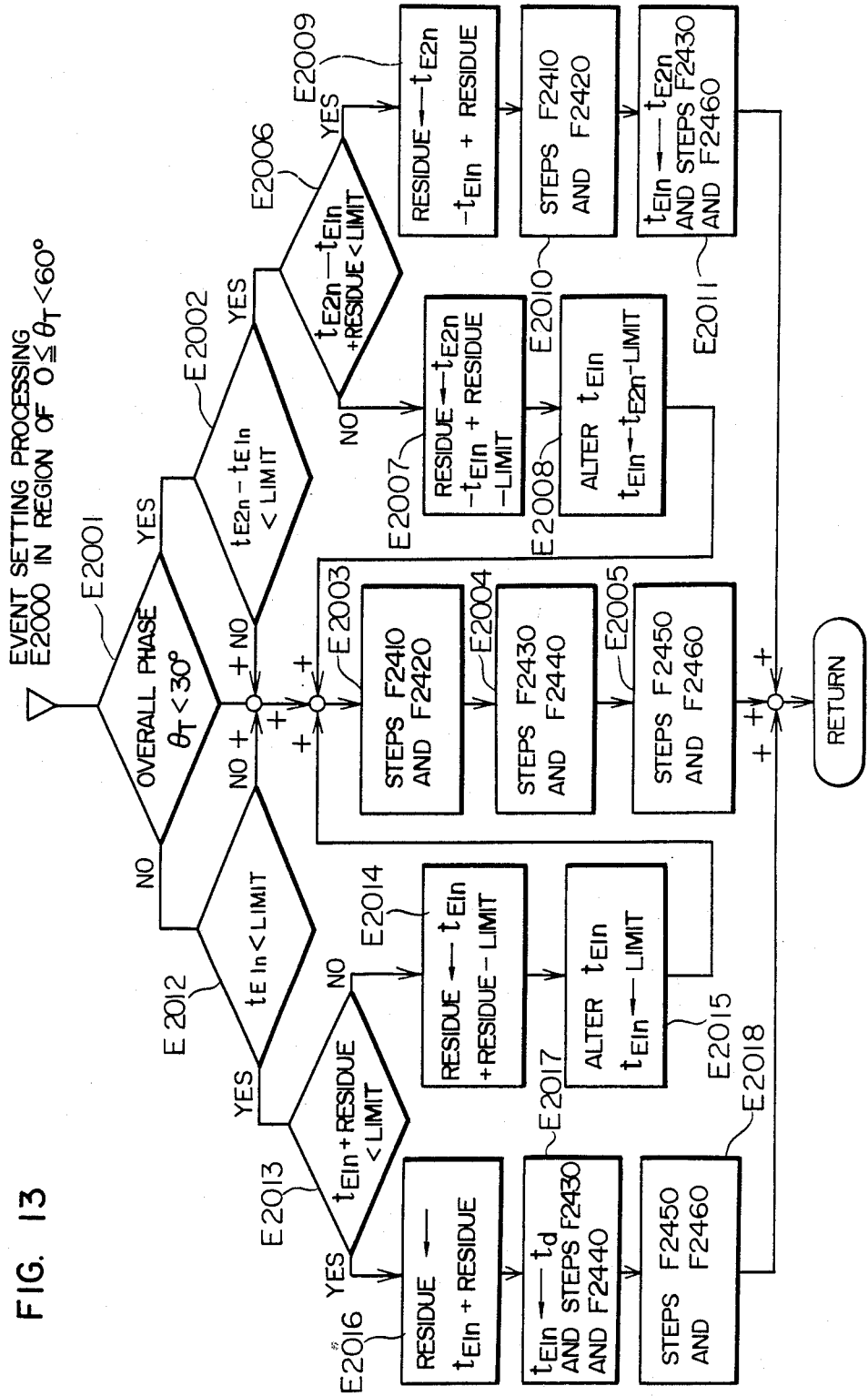
FIG. 13 is a flowchart showing an embodiment of details of the processing shown in FIG. 5 when a phase $\theta_T$ falls in a range represented as $0 \leq \theta_T < 60°$.

The processing has heretofore been described with reference to FIGS. 11 and 13 by taking a section whose phase angle exists in the range 0° to 60° as an example. When $\theta_T$ comes in another region, it is a matter of course that the transistors to be extinguished and fired must be altered depending upon the value of $\theta_T$ as shown in FIG. 8. Therefore, there are five kinds of processing (E2100, E2200, E2300, E2400 and E2500 of FIG. 12) similar to the event setting processing E2000 as shown in FIG. 13. That is to say, pulse dropping is performed in the vicinity of mode changeover (indicated by arrows) as shown in FIG. 17.

Figure 17:
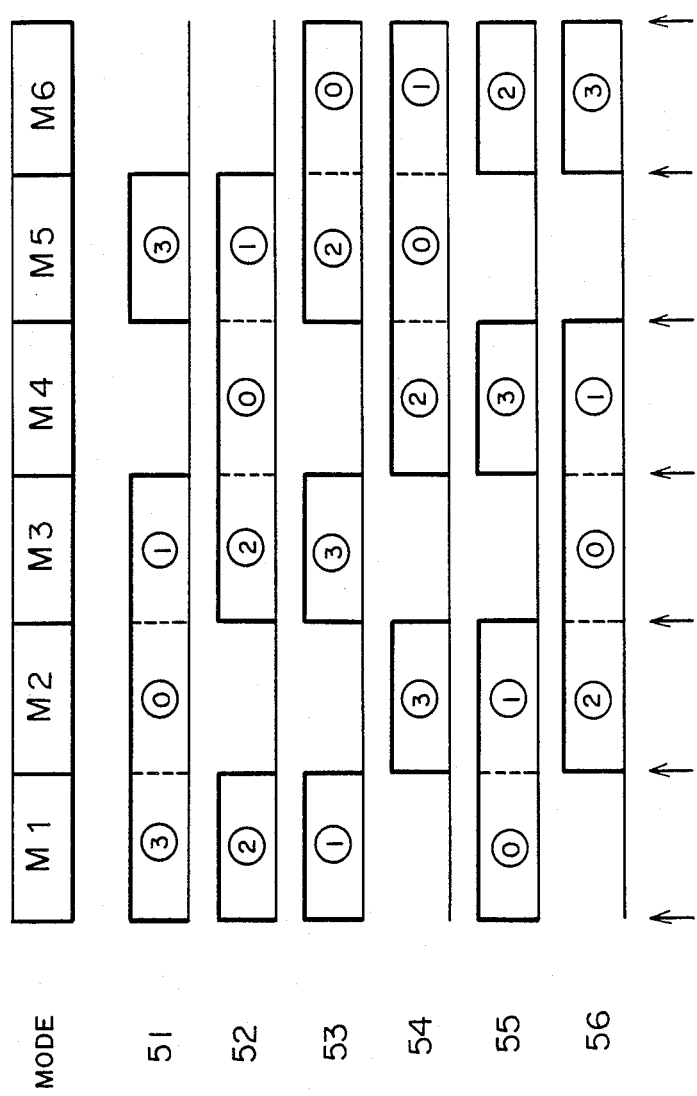
FIG. 17 shows an embodiment of firing sequence of power conversion devices in the vicinity of the center of each mode.

Symbols ⓪ to ③ in FIG. 17 denote firing orders of transistors in a region (near the center of the mode) where the pulse dropping is not performed. That is to say, symbol ⓪ represents a transistor which is always in the ON state. Symbol 501① represents a transistor which is in the ON state until the occurrence of the first event. Symbol ② represents a transistor which is in the ON state from the occurrence of the first event until the occurrence of the seven event. Symbol ③ represents a transistor which is in the ON state from the occurrence of the second event until the occurrence of the third event.

In the embodiment of the present invention, it is possible to make the output sinusoidal up to the ultralow frequency region without suffering the restriction on the minimum pulse width of power conversion devices using the output of the inverter. If the present embodiment is applied to a current-type inverter, for example, therefore, the torque ripple of the induction motor 7 forming the load can be significantly reduced. When the present embodiment is applied to a voltage-type inverter, the torque ripple is similarly reduced.

Figure 18:
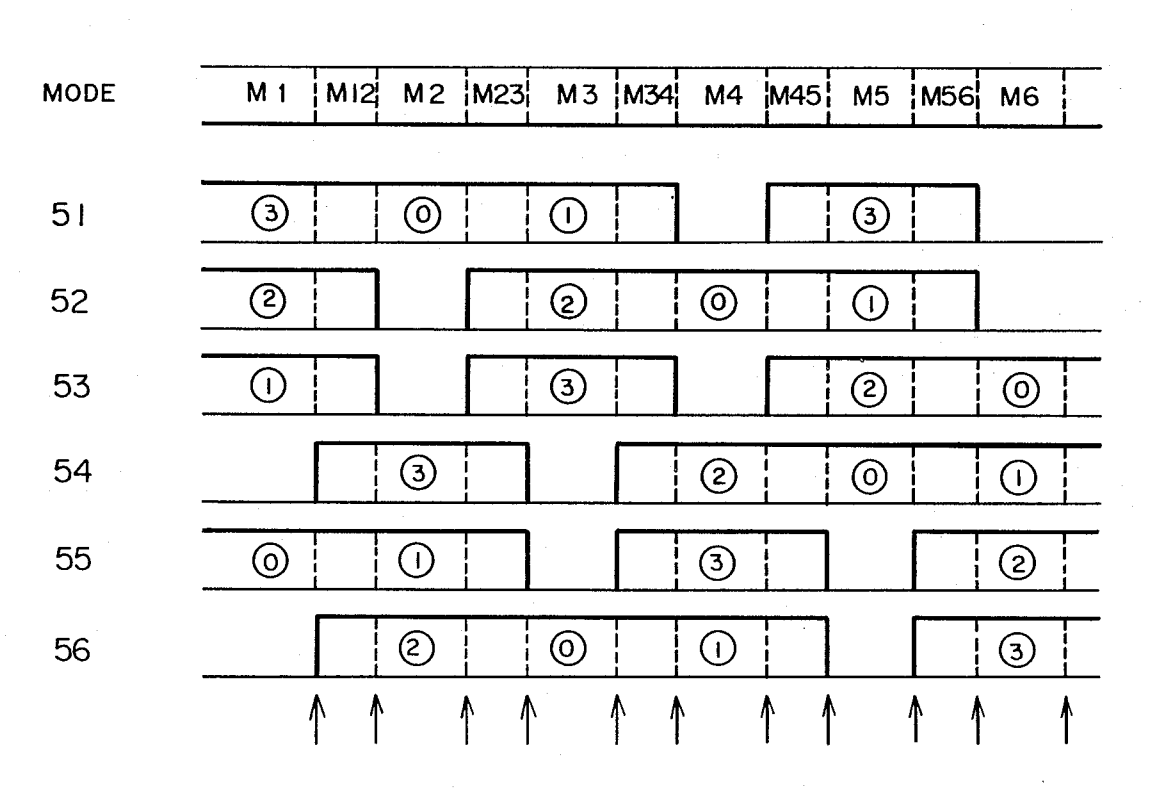
Figure 19:
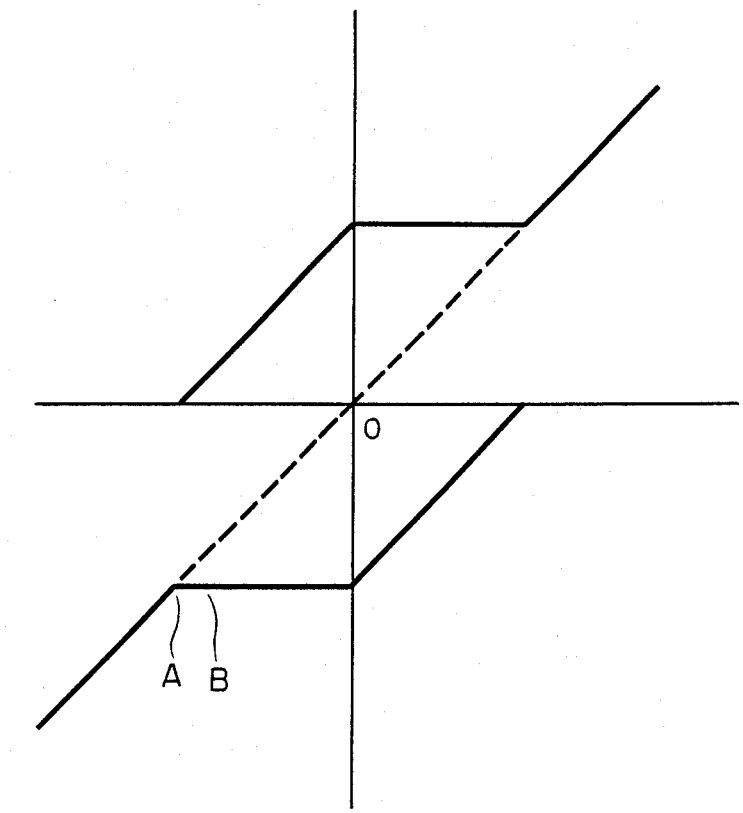
FIG. 19 schematically shows the state of current near the electrical angle 0° according to another embodiment of the present invention.

FIGS. 18 to 20 show another embodiment of the present invention. In the example shown in FIG. 17, the mode is definitely changed over at intervals of electrical angle 60°, and pulse dropping is performed at both ends of the mode. On the other hand, FIG. 18 shows an example of pulse dropping introduced into a system having overlapped modes. In a transition section of modes M1 and M2, for example, there exists a mode M12 having modes M1 and M2 therein. Therefore, pulse dropping is performed near locations indicated by arrows in FIG. 18.

FIG. 19 schematically shows the current state in the vicinity of electrical angle 020. As far as a point A, the mode M6 is assumed. When a point B in a mode M61 is reached, pulses of the mode M6 side having width fixed to the minimum pulse width are outputted during the pulse dropping operation. When the integration value of the pulse width has reached the limit value (i.e., when the pulse dropping is not performed), the mode M1 is activated. (Pulses having width fixed to the minimum pulse width of the mode M1 are outputted.) As the operation point moves from B to the time "0", the interval required for the integrated value to reach the limit value becomes shorter and the mode 1 occurs more frequently. At the time "0", the occurrence proportions of the modes 1 and 2 become equal each other.

After the operation point goes beyond the time "0", the object of dropping is changed over to the mode M6. Until the integration value of pulse width reaches the limit value (i.e., under the state that pulse dropping is performed), a pulse of mode M1 having pulse width fixed to the minimum pulse width is outputted. When the integration value has reached the limit value (i.e., under the state that pulse dropping is not performed), a pulse of mode M6 having pulse width fixed to the minimum pulse width is outputted.

FIG. 20 shows a pulse pattern of the present scheme appearing during the transition from the mode M1 to the mode M2. In the illustrated case, the frequency command of the inverter indicates 6 Hz. Accordingly, the period during which the mode M1 is mixed with the mode M2 is short.

In accordance with the principle of the present scheme, it is possible to control the output so that the output may be smoothly changed to the opposite polarity across the zero level.

If the present invention is applied to a converter, the AC side, i.e., the power source side has nearly perfect sinusoidal waveform. It is thus possible to realize a clean AC-DC converter which does not drain harmonic currents to external devices such as phase advancing capacitors.

In the above described embodiment, a sine function is used in calculation of the pulse width data values $t_{E1n}$ and $t_{E2n}$. In this case, pulse dropping for realizing sinusoidal waves can be performed by using simple integration in the calculation of the residue.

On the other hand, there is a scheme in which the pulse width data $t_{E1n}$ and $t_{E2n}$ are derived by comparing a triangular carrier wave with a linear modulated wave. By using the pulse dropping of the present embodiment in this scheme and using the weighted integration instead of simple integration in the calculation of the residue, the output can be made sinusoidal.

Owing to the present invention heretofore described, it is possible to equivalently eliminate in pulse generation the influence of the minimum pulse width of power conversion devices. As a result, it becomes possible to make the input and output of a power converter sinusoidal up to an ultralow frequency region.

We claim:

1. An apparatus for controlling a power converter system including a power converter circuit having a plurality of power semiconductor elements and pulse generator means for producing pulses which control conduction of said semiconductor elements so as to cause said power converter circuit to produce an output of a predetermine pattern, said apparatus comprising:

means for repeatedly executing at a selected time interval an event calculation process for determining active ones of said semiconductor elements which should be rendered conductive in an instant period of time interval until execution of the next event calculation process and a conductive time for which each of said active semiconductor elements should be conductive based on at least one input determined according to the predetermined pattern of the output of said power converter circuit applied thereto;

means for comparing said conductive time of each of said active semiconductor elements with a predetermined first value of the conductive time;

means for correcting the conductive time of any of said active semiconductor elements, when the conductive time is less than said first value, to a selected one of zero and a predetermined second value not less than said first value which is selected depending on a history of the conductive times of said active semiconductor elements determined in previous event calculation processes; and means for determining a pulse width of the pulse to be produced by said pulse generator means for controlling the conduction of each of said active semiconductor elements in correspondence with the conductive time determined for said active semiconductor element, when said conductive time is not less than said first value, and in correspondence with the corrected conductive time for said active semiconductor element, when the conductive time before correction is less than said first value.

2. An apparatus according to claim 1, wherein the output of said power converter circuit has a form of a substantially sinusoidal curve.

3. An apparatus according to claim 1, wherein said power converter circuit is a dc to ac converter.

4. An apparatus according to claim 1, wherein said power converter circuit is an ac to dc converter.

5. An apparatus according to claim 1, wherein said first value is a predetermined lower limit of the conductive time for said active semiconductor element.

6. An apparatus according to claim 5, wherein said second value is equal to said lower limit.

7. An apparatus according to claim 6, wherein said correcting means includes means for accumulating the conductive times which are determined in successive event calculation process and less than said lower limit and storing an accumulated value of the conductive times, means for comparing said accumulated value of the conductive times with said lower limit, means for causing the corrected conductive time to be zero when said accumulated value is less than said lower limit and to be said limit when said accumulated value is not less than said lower limit, and means for substituting said stored accumulated vale, when said accumulated value is not less than said lower limit, by a value equal to said accumulated value subtracted by said lower limit.

8. An apparatus according to claim 1, wherein said pulse generator means includes:

an associative memory for storing scheduled timings for producing the pulses for controlling the conduction of said active semiconductor elements determined in successive event calculation processes, said scheduled timings being determined based on the pulse widths determined by said pulse width determining means, a timer for producing a signal indicative of an instant time, and means for comparing each of the scheduled timings with the instant time indicated by said timer and producing the pulse associated with the scheduled timing which coincides with the instant time.

9. An apparatus according to claim 1, wherein said predetermined pattern of the output of said pulse generator means is a repetition of a set of modes arranged in a predetermined order, each of said modes being determined depending on an electrical angle in phase of the output.

10. An apparatus according to claim 1, wherein said pattern of the output of said pulse generator means is a repetition of a set of modes arranged in a predetermined order in which each of said modes is determined depending on an electrical angle in phase of the output and every two adjacent modes are overlapped.

* * * * *